United States Patent Office 3,639,355
Patented Feb. 1, 1972

3,639,355
POLYURETHANE COATING COMPOSITIONS HAVING IMPROVED VISCOSITY CHARACTERISTICS
George S. Wooster, Hamburg, and Frank M. Delgado, Tonawanda, N.Y., assignors to Allied Chemical Corporation, New York, N.Y.
No Drawing. Continuation-in-part of application Ser. No. 729,378, May 15, 1968. This application Oct. 8, 1968, Ser. No. 765,970
The portion of the term of the patent subsequent to Dec. 7, 1988, has been disclaimed
Int. Cl. C08g 22/06
U.S. Cl. 260—77.5 AP          5 Claims

ABSTRACT OF THE DISCLOSURE

Novel polyurethane coating compositions characterized by excellent curing properties and low viscosities are prepared from 4,4'-methylene bis (cyclohexyl isocyanate) and mixtures of polyether triols.

This application is a continuation-in-part of our U.S. application Ser. No. 729,378 filed May 15, 1968.

Polyurethane compositions derived from 4,4'-methylene bis (cyclohexyl isocyanate) are known to provide excellent properties for a variety of coating applications. Coatings derived, for example, from the reaction of this diisocyanate with a polyol are characterized by excellent toughness, flexibility and color stability, and, particularly in the presence of a catalyst, e.g. an organo-tin compound, will dry to a tack-free film in a few hours. However, a complete cure, that is "through-cure" of the coating by which a coating is considered to have cured throughout the thickness of the film generally requires a considerably longer time, in the order of several days. For many applications the drying of the coating to a tack-free state is sufficient to permit normal use of the object or structure that has been coated, even though "through-cure" has not taken place. However, in applications where the coating is subjected to particularly heavy use, as in the case of seamless floorings, it is important that through-cure taken place before the coated surface is put into normal use. In such cases a rapid through-cure rate of the coating composition is particularly advantageous and is an important consideration in the selection of the coating formulation.

In addition to the "through-cure" rate of the coating, still another consideration is the solution characteristics of the coating compositions. Many compositions possess solution properties that give rise to solutions that are of such a low viscosity at desirable solids content as to provide compositions that are too thin to be of practical value while others are of relatively high viscosities at desirable solids content and such viscosity characteristics may lead to difficulties in application. For example, in some applications, such as spraying, a relatively low viscosity is required. In addition, in coating processes where a high degree of penetration of the substrate is desired, a high viscosity solution is particularly disadvantageous and it is often necessary to employ excessive amounts of solvents to obtain desirable viscosity characteristics. The use of such amounts of solvent to obtain desirable viscosity characteristics obviously represents an economic disadvantage since the solvent is lost by evaporation during drying and does not form a part of the final coating. Accordingly, extensive and intensive efforts have been made to provide coating compositions which are quick-drying, in "through-cure" and "tack-free" rates and which also have suitable solution characteristics.

It is, therefore, a principal object of the present invention to provide polyurethane coating compositions having improved solution characteristics.

Another object is to provide coating compositions of relatively low viscosity at desirable solids content.

It is a further object of the present invention to provide polyurethane coating compositions having substantially improved through-cure rates.

It is a further object to provide polyurethane coating compositions having improved tack-free drying times, and improved hardness characteristics in the cured coating.

It is another object of this invention to provide a method of producing such improved coating compositions.

These and other objects and advantages which will be apparent hereinafter are accomplished in accordance with the present invention which is described and claimed below.

We have discovered that novel polyurethane coating compositions characterized by improved solution characteristics and tack-free rates can be prepared by providing a composition which comprises, as the essential film former, the reaction product of a mixture of 70 to 80 mol percent of 4,4'-methylene bis (cyclohexyl isocyanate) and 30 to 20 mol percent of a blend of at least two polyether triols, said blend comprising (A) between about 15 and 70 mol percent of a triol having a high effective molecular weight ($\overline{Emw}$) of between about 800 and 2000 and (B) between about 30 and 85 mol percent of a triol having a low $\overline{Emw}$ of between about 200 and 700, the ratio of molecular weights of said high $\overline{Emw}$ triol and said low $\overline{Emw}$ triol being within the range of 1.5 to 1 and 5.2 to 1 and the NCO/OH ratio of the diisocyanate and triol reactants being less than 2.0 but more than 1.5.

We have further discovered that certain of these novel coating compositions when derived by the reaction of 4,4'-methylene bis (cyclohexyl isocyanate) within the limits set forth above but containing (A) between about 20 to 30 mole percent of a triol having a high $\overline{Emw}$ of about 1000 to 200 and (B) 70 to 80 mol percent of a triol having a low $\overline{Emw}$ of about 250 to 700 are not only characterized by improved solution characteristics and tack-free rates but are characterized by improved through-cure rates and hardness as well.

The effective molecular weight ($\overline{Emw}$) of the triol reactants is an important characteristic by which these reactants are selected and which gives rise in large part to the properties of the final product and is governed by the hydroxyl number of the triol according to the relationship $$\overline{Emw} = \frac{(3)(56,100)}{OHNo}$$

Thus a triol having an $\overline{Emw}$ of between 700 and 2000 inherently has an hydroxyl number of between about 67 and 240; and a triol having an $\overline{Emw}$ of between about 200 and 700 inherently has an hydroxyl number of between about 240 and 840.

The $\overline{Emw}$ of the triols are selected so that the ratio $$\frac{\overline{Emw} \text{ high triol}}{\overline{Emw} \text{ low triol}}$$

is within the range of 1.5 to 1 and 5.2 to 1. At ratios outside this range, as shown hereinbelow, the viscosities of the solutions are adversely effected resulting in either gelation of the polymer or in a solution that is too thin to be of value. Preferably, the ratio $$\frac{\overline{Emw} \text{ high}}{\overline{Emw} \text{ low}}$$

will be between about 2.0 to 1 to 4 to 1.

The mixing ratio of the triol reactants and the isocyanate component is such that the coating composition contains between about 20% and 80% solids, preferably between about 35% and 50% solids (by weight), the balance being volatile solvent. The concentration of the active components is adjusted so that the NCO/OH ratio is within the range of more than 1.5 to 1 to less than 2.0 to 1. At ratios outside this range, the viscosities of the solutions are adversely affected as illustrated hereinbelow and the tack-free times are adversely affected as well. Preferably, the NCO/OH ratio is between about 1.7 to 1.9, i.e. about 1.8.

The polyether triols used in production of the novel coating compositions of the present invention are well known commercially available materials. In general, such polyether triols are commercially available such as castor oil or are obtained in known manner by condensation of an alkylene oxide, such as ethylene oxide, 1,2-propylene oxide, 1,3-propylene oxide or mixtures thereof with a low molecular weight triol such as glycerine, trimethylol propane, hexane-1,2,6-triol or mixtures thereof and the like, in the presence of suitable catalysts or initiators such as trialkylamines, e.g. trimethylamine, or inorganic bases, e.g. potassium hydroxide, or halides, e.g. boron trifluoride. The commercially available triols are available in a wide range of average molecular weights and thus in a wide range of hydroxyl numbers. A triol prepared, for example, by the condensation of 1,2-propylene oxide and glycerine would have the structure

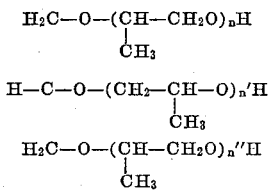

wherein $n$, $n'$, and $n''$ are integers. Especially preferred are the commercially available polyether triols based on propylene oxide and trimethylol propane having average molecular weights within the range of about 300 to about 1500.

The hydroxyl number of a polyl is defined in accordance with ASTM-D1638 as the number of milligrams of potassium hydroxide equivalent to the hydroxyl content of one gram of the polyether polyol. The hydroxyl number of a specific triol can be determined in accordance with the test procedures described in detail in the aforementioned ASTM-D1638.

A general discussion of polyethers can be found in Saunders et al., Polyurethanes, Chemistry and Technology, Part I. Chemistry, High Polymers, vol. XVI, Interscience Publishers, New York, 1962, pp. 32–44.

4,4'-methylene bis(cyclohexyl isocyanate), hereinafter referred to as $H_{12}MDI$, is the isocyanate and may be used in any of its various isomeric forms or mixtures thereof. The compound exists in 3 different isomeric forms depending on the position, i.e. cis or trans, of the isocyanate group with respect to the methylene bridging group. The usual commercial grades of the isocyanate are mixtures of various proportions of the 3 isomers, i.e. the cis-cis, cis-trans, and trans-trans isomers. The isomers can be separated by conventional physical separation techniques. Either the pure isomers or mixtures thereof are suitable for use in the compositions of the present invention. Because of the faster reactivity of the trans isomer with hydroxyl groups, $H_{12}MDI$ containing a preponderance of trans isomer is preferred.

The novel coating compositions of the present invention are the "one can" type and may be employed in a conventional solvent and applied to a substrate by the usual methods, spraying, dipping, flow-coating, and the like. Conveniently, the solvent is added prior to reaction of the triols and $H_{12}MDI$, thereby providing a reaction medium as well as a vehicle for the coating composition. Suitable solvents include for example, the lacquer type organic solvents, such as ethyl acetate, butyl acetate, toluene, xylene, cyclohexanone, bis ($\beta$-ethoxy ethyl) ether, glycol monoether acetate and the like or mixtures thereof.

Preferably a catalyst is employed to promote the formation of the polyurethane reaction product. Typical catalysts include, for example, the well-known metal "driers," such as lead naphthenate; and organo-mercury compounds, such as phenyl mercuric propionate; and organotin compounds, such as dibutyltin dilaurate, tetramethyl tin, dimethyl dioctyltin, dilauryltin difluoride, di-2-ethylhexyltin bis (monobutylmaleate), tri-n-butyl tin acetonate and the like and mixtures thereof. The catalyst is advantageously employed in an amount of about 0.005 to 0.5 percent by weight based on the weight of polyurethane reactants. Preferably, the catalyst is added in two portions, the minor portion, e.g. about 50% or less, being added to the urethane reaction mass, and the major portion, e.g. about 50% or more, being added to the coating composition to accelerate the drying and/or curing of the film. When added in two portions, the same or different catalyst can be used.

In accordance with what is now conventional practice for producing coating compositions, the novel coating compositions of the present invention may also be produced in the presence of various adjuvants such as stabilizers, flowing agents, plasticizers, activators and the like.

PREPARATION OF COATING COMPOSITIONS

The coating compositions can be prepared by forming a dry mixutre of the solvent, polyol and isocyanate and then adding the catalyst. In the preferred procedure the solvent and polyol are first mixed and then azeotropically distilled to remove any free water. Preferably, the reaction is carried out under a blanket of a dry inert gas such as nitrogen to prevent contact of the reaction mixture and atmospheric moisture. The mixture is heated to between about 90–110° C. for a period of at least one hour.

The reaction may be considered complete when the measured "amine equivalent" of the batch exceeds the theoretical value usually in the range of about 10 to 20% over the theoretical value. By "amine equivalent" is meant the weight of the mass which contains one equivalent weight of isocyanate, the weight units being consistent. It is determined by a well known analytical procedure involving a reaction between isocyanate and a measured excess of n-dibutyl amine to form the corresponding urea and back-titration with standard HCl solution to measure the unreacted n-butylamine. The theoretical amine equivalent is given by the expression $$AE = WB/[n(NCO) - n(OH)]$$

wherein:

AE = amine equivalent
WB = weight of batch
$n(NCO)$ = number of equivalents of isocyanate (Total) charged to process
$n(OH)$ = number of equivalents of hydroxyl (Total) charged to process.

The amine equivalent is determined as follows: dilute 6 to 25 grams of sample, with 30–50 cc. of C.P. toluene, add 20 cc. of 2 N solution of dibutyl amine in toluene, heat 5 to 10 minutes (do not boil), cool, add 100 cc. of methanol, add 10 drops of Bromphenol Blue indicator solution, titrate with 1 N HCl to the disappearance of blue color, run a blank. The value of the measured amine equivalent is calculated by the equation:

$$AE = \frac{1000WS}{(TB - TS)N}$$

wherein:

WS = weight of sample in grams
TB = titration of blank in ml. HCl

TS=titration of sample in ml. HCl
N=normality of HCl

The analytical procedure is similar to a method for assaying tolylene diisocyanate described in paragraphs 5–13 inclusive of ASTM method 1638–60T. (See U.S. Pat. 3,351,573 col. 6, lines 54ff.).

To further illustrate the present invention and the manner in which it may be practiced the following specific examples are set forth.

EXAMPLES 1 TO 8

Coating compositions were prepared as described above using the ingredients and proportions shown in Table I below. The coating compositions were tested for solution viscosity and the results expressed on the Gardner-Holdt Scale (Physical and Chemical Examination—Paints, Varnishes, Lacquers, Colors by Gardner-Sward Twelfth Edition, 1962 page 172). In Table I, Examples 1, 3 and 5 are examples of the invention while Examples 2, 4, 6, 7 and 8 are comparative examples which are outside the scope of the invention.

In Example 8, the polymer reaction was terminated before the Amine Equivalent (measured) exceeded the theoretical value, and for this reason, as well as the high NCO/OH ratio and $\overline{Emw}$ ratio of high to low triols, the composition was unsatisfactory.

EXAMPLES 9 TO 12

Coating compositions in accordance with the present invention were prepared using the preferred procedure described above using the amounts of ingredients shown in Table II below. The coating compositions were evaluated with respect to through-cure rates and hardness in the manner described herein below. Examples 9 and 10 (which corresponds to Example 1 in Table I) are within the scope of the established limits. For purposes of comparison the compositions of Examples 11 and 12 (which corresponds to Example 3 in Table I) were similarly prepared and compared with Examples 9 and 10 respectively.

To each coating composition prepared as described below, an additional 0.3 percent dibutyltin dilaurate catalyst (based on the amount of total non-volatiles) was added

TABLE I

| Example | 1 | 2 | 3 | 4 | 5 | 6 | 7 | 8 |
|---|---|---|---|---|---|---|---|---|
| Composition (grams): | | | | | | | | |
| 4,4'-methylene bis (cyclohexylisocyanate) trans-cis ratio= about 75/25, by weight | 163 | 165 | 165 | 165 | 165 | 165 | 165 | 165 |
| Triol: | | | | | | | | |
| Pluracol TP-1540 ($\overline{Emw}$ 1557) | 80.4 | 121.5 | | | | | | |
| Pluracol TP-740 ($\overline{Emw}$ 732) | | | 109.5 | 121.5 | 86.3 | 109.2 | 127 | 131 |
| Pluraclo TP-440 ($\overline{Emw}$ 423) | | | | | 48.7 | 25.8 | | |
| Pluracol TP-340 ($\overline{Emw}$ 303) | 54.6 | | 25.5 | 13.5 | | | | |
| Hexanetriol ($\overline{Emw}$ 134) | | 13.5 | | | | | 8 | 4 |
| Solvent (xylene) | 450 | 450 | 450 | 450 | 450 | 450 | 450 | 450 |
| Catalyst (dibutyltin dilaurate) | 0.1 | 0.1 | 0.1 | 0.1 | 0.1 | 0.1 | 0.1 | 0.1 |
| NCO/OH | 1.8 | 1.8 | 1.8 | 2.0 | 1.8 | 2.0 | 1.8 | 2.0 |
| $\overline{Emw}$ high/$\overline{Emw}$ low | 5.1 | 11.6 | 2.41 | 2.41 | 1.73 | 1.73 | 5.45 | 5.45 |
| Non-volatiles, percent | 40 | 40 | 40 | 40 | 40 | 40 | 40 | 40 |
| Viscosity | L-M | Gel | J | A-B | J | A | T-U | A-B |
| Amine equivalent: | | | | | | | | |
| Theoretical | 1,330 | 1,030 | 1,335 | 1,192 | 1,335 | 997 | 1,340 | 1,400 |
| Measured | 1,460 | | 1,460 | 1,335 | 1,452 | 1,271 | 1,440 | 1,285 |
| Composition (mol percent): | | | | | | | | |
| 4,4'-methylene bis (cyclohexyl isocyanate) | 73.3 | 77.6 | 73.2 | 75.0 | 73.3 | 75.0 | 64.5 | 75.2 |
| Triol (total) | 26.7 | 22.4 | 26.8 | 25.0 | 26.7 | 25.0 | 35.5 | 24.8 |
| Pluracol TP-1540* | 5.8 | 9.65 | | | | | | |
| Pluracol TP-740 | | | 17.2 | 19.6 | 13.5 | 17.8 | 17.4 | 21.2 |
| Pluracol TP-440 | | | | | 13.2 | 7.2 | | |
| Pluracol TP-340 | 20.9 | | 9.6 | 5.4 | | | | |
| Hexanetriol | | 12.75 | | | | | 18.1 | 3.6 |

* Commercial polyether triols (Wyandotte) based on propylene oxide and trimethylolpropane the numbers of which indicate the average molecular weights.

Thus, it can be seen from Table I that compositions prepared within the limits specified above have suitable viscosity properties while those prepared outside these limits do not.

Thus, Examples 2, 7 and 8, in which the ratio of the $\overline{Emw}$ of the high and low molecular weight triols in outside the desired range, illustrate the effect of this blend of triols on the viscosity. In Example 2, the polymer gelled and hence was unsatisfactory although the same high $\overline{Emw}$ triol was employed as in Example 1. In Example 7, in which, also the proportion of diisocyanate, 64.5 mol percent was below the minimum of 70 mol percent, the solution was quite viscous, whereas in Example 8, in which the NCO/OH ratio, also, was above the maximum of less than 2.0, the coating solution was too thin to be of value.

Examples 3 and 4 and 5 and 6 respectively are pairs of examples for comparative purposes and involve blends of the same triol combinations, Examples 3 and 5 being within the scope of the invention and Examples 4 and 6 being outside the scope of the invention. Thus in these sets of examples wherein the $$\frac{\overline{Emw} \text{ high triol}}{\overline{Emw} \text{ low triol}}$$

were identical (2.41 and 1.73 respectively) but the NCO/OH ratios were above the maximum of less than 2.0 in the comparative examples, the coating solutions were too thin to be of value.

prior to the actual coating application, to accelerate the drying thereof.

TABLE II

| Example | 9 | 10 | 11 | 12 |
|---|---|---|---|---|
| Composition (grams): | | | | |
| 4,4'-methylenebis (cyclohexyl isocyanate) | 470 | 165 | 147.5 | 165 |
| Triol (total) | 470 | 135 | 152.3 | 135 |
| Pluracol TP-1540 (OHNo.=110) [1] | 258 | 80 | | |
| Pluracol TP-740 (OHNo.=230) [1] | | | 152.3 | 110 |
| Pluracol TP-440 (OHNo.=404) [1] | 212 | | | |
| Pluracol TP-340 (OHNo.=561) [1] | | 55.0 | | 25 |
| Solvent (xylene) | 1,408 | 450 | 450 | 450 |
| Catalyst (dibutyltin dilaurate) | 0.325 | 0.10 | 0.10 | 0.10 |
| NCO/OH | 1.8 | 1.8 | 1.8 | 1.8 |
| $\overline{Emw}$ high/$\overline{Emw}$ low | 3.6 | 5.1 | | 2.4 |
| Amine equivalent: | | | | |
| Determined | 1,635 | 1,460 | 1,630 | 1,460 |
| Theoretical | 1,470 | 1,210 | 1,460 | 1,265 |
| Viscosity at 40% non-volatiles | J | L-M | H | J |
| Composition (mol percent): | | | | |
| 4,4'-methylenebis (cyclohexyl isocyanate) | 73.25 | 72.0 | 73.0 | 72.05 |
| Triol (total) | 26.75 | 27.00 | 27.0 | 27.95 |
| TP-1540 [1] | 6.75 | 6.15 | | |
| TP-740 [1] | | | | 18.00 |
| TP-440 [1] | 20.00 | | | |
| TP-340 [1] | | 21.85 | | 9.95 |
| Triol composition: | | | | |
| High $\overline{Emw}$ triol (TP-1540) | 28.4 | 22.3 | | |
| High $\overline{Emw}$ triol (TP-740) | | | 100.0 | 64.5 |
| Low $\overline{Emw}$ triol (TP-440) | 75.2 | | | |
| Low $\overline{Emw}$ triol (TP-340) | | 77.7 | | 35.5 |

[1] Commercial polyether triols based on propylene oxide and trimethylolpropane the numbers of which indicate the average molecular weights.

THROUGH CURE RATES

The through-cure rates of the foregoing compositions were evaluated as follows: A film was prepared from each composition, by applying a few drops of the composition on a NaCl plate and smearing between two plates. The films were cured at 50 percent relative humidity and 72 degrees Fahrenheit. At various intervals during curing, the degree of cure was measured in terms of free —NCO groups by infra-red absorbance at 4.45μ, using a Perkin-Elmer Infra-red Unit No. 337. The percent cure was calculated as:

Percent cure=
$$\frac{\text{Initial adsorbancy} - \text{Absorbancy at time(t)}}{\text{Initial absorbancy}}$$

The percent cure for each sample, taken at the times shown was as follows:

|  | Percent | | | |
|---|---|---|---|---|
| Example | 9 | 10 | 11 | 12 |
| Time, days: | | | | |
| 1 | 54.0 | 43.5 | 36.8 | 20.2 |
| 2 | 63.4 | 51.4 | 42.9 | 28.9 |
| 3 | 67.0 | 54.4 | 49.6 | 29.6 |
| 4 | 74.0 | 61.0 | 56.0 | 36.0 |

HARDNESS OF COATINGS

Coatings were prepared from each composition by pouring into a metal mold and evaporating the solvent to provide a dry film of about 60 mils thickness. The coatings were cured at 50 percent relative humidity and 72 degrees Fahrenheit for 6 days and then tested for "Shore D" hardness described in ASTM D–1706 test procedure. The results as shown below indicate the advantages of the present compositions with regard to improved hardness characteristics:

| Example | 9 | 10 | 11 | 12 |
|---|---|---|---|---|
| Shore D hardness (±2) | 45 | 50 | 35 | 35 |

Thus, it can be seen that those compositions which result from a blend of triols comprising 20 to 30 mole percent of triol having a $\overline{Emw}$ of about 1000 to 2000 and 70 to 80 mol percent of a triol having a $\overline{Emw}$ of about 250 to 700 are further characterized by improved through-cure rates and hardness properties.

EXAMPLES 13 TO 16

To illustrate the improvement in the tack-free drying times obtained in accordance with the present invention, the solutions of Examples 1, 3 and 4 (comparative), 5 and 6 (comparative) of Table I and 9 and 11 (comparative) of Table II were selected and to each solution, 0.3% (by weight) of dibutyltin dilaurate, based on percent nonvolatiles, was added as a drying catalyst. Thereafter, a 3 mil (wet) film was laid down on a clean glass plate using a Bird applicator and the film cured at ambient conditions (35–39% RH at 77° F.). The time for each film to attain tack-free condition was noted and recorded below in Table III.

TABLE III

| Example | 13 | | 14 | | 15 | 16 |
|---|---|---|---|---|---|---|
| Solution of example | 3 | 14 | 5 | 16 | 9 | 111 |
| Track-free time (hours) | 1.0 | 1.5 | 1.0 | 3.75 | 2.4 | 5.5 | 0.6 |
| Triol blend | TP-740 | TP-740 | TP-1540 | TP-1540 | TP-740 | TP-1540 |
|  | TP-340 | TP-440 | TP-440 | | | TP-340 |
| NCO/OH ratio | 1.8 | 2.0 | 2.8 | 2.0 | 1.8 | 1.8 | 1.8 |

[1] Control.

It can thus be seen that coating compositions having improved viscosity, rapid tack-free times, and improved through-cure rates, have been provided by control of the effective molecular weights of the triols blended to react with 4,4'-methylene bis (cyclohexyl isocyanate) and the relative proportion of diisocyanate and triol blend used.

Our invention has been fully described in the above specification and illustrated by several descriptive examples, which include the best mode presently known of carrying out the inventions. The invention is not, however, limited to the details set out in these purely illustrative examples, since as will be obvious to those skilled in this art, considerable variation in these details can be made without departing from the scope of spirit of our invention.

We claim:
1. A polyurethane coating composition comprising, as the essential film former, the reaction product, in an inert organic solvent, of a mixture comprising 70 to 80 mol percent of 4,4'-methylene bis (cyclohexyl isocyanate) and 20 to 30 mol percent of a blend of at least two polyether triols comprising (A) between about 15 and 70 mole percent of a triol having a high $\overline{Emw}$ of between about 700 and 2000 and (B) between about 30 and 85 mol percent of a triol having a low $\overline{Emw}$ of between about 200 and and 700; the ratio of said high $\overline{Emw}$ triol and said low $\overline{Emw}$ being within the range of 1.5:1 and 5.2:1 and the NCO/OH ratio of the diisocyanate and triol reactants being less than 2.0 but more than 1.5.

2. A composition as claimed in claim 1 wherein said triol blend comprises (A) between about 20 to 30 mol percent of a triol having an $\overline{Emw}$ of about 1000 to 2000 and (B) between about 70 to 80 mol percent of a triol having an $\overline{Emw}$ of about 250 to 700.

3. A. composition as claimed in claim 1 wherein the ratio of high $\overline{Emw}$ triol to low $\overline{Emw}$ triol is within the range of 2.0 to 1 and 4 to 1.

4. A composition as claimed in claim 1 wherein the NCO/OH ratio is about 1.8.

5. A composition as claimed in claim 1 wherein said low $\overline{Emw}$ and high $\overline{Emw}$ polyether triols are derived from propylene oxide and trimethylolpropane.

References Cited

UNITED STATES PATENTS 3,354,100    11/1967    Kuryla _____ 260—77.5 X

OTHER REFERENCES

Siefken, Annalen der Chemie, 562, 1949, pp. 121 and 125.

Saunders et al., Polyurethanes, part II, Interscience, New York, 1964, pp. 477–485.

DONALD E. CZAJA, Primary Examiner

M. J. WELSH, Assistant Examiner

U.S. Cl. X.R.

260—77.5 AT